Aug. 25, 1959     S. L. BEESLEY     2,901,118
STORING AND DISPENSING APPARATUS
Filed June 11, 1958
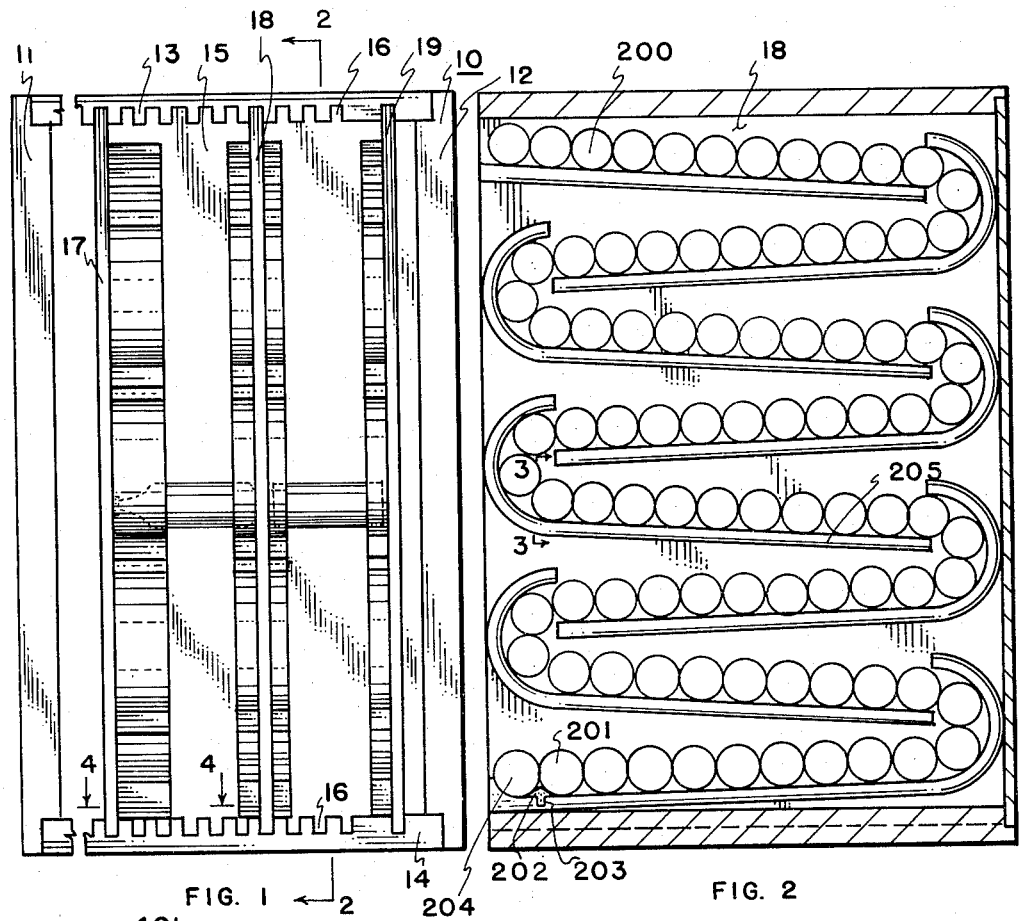
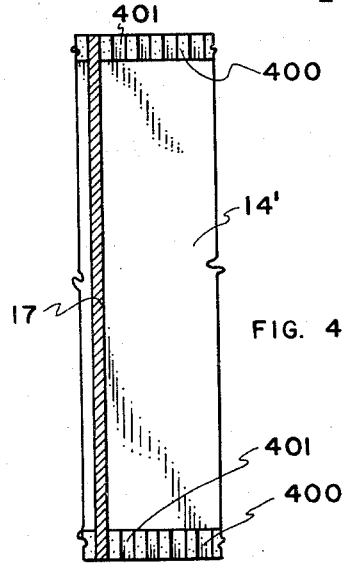
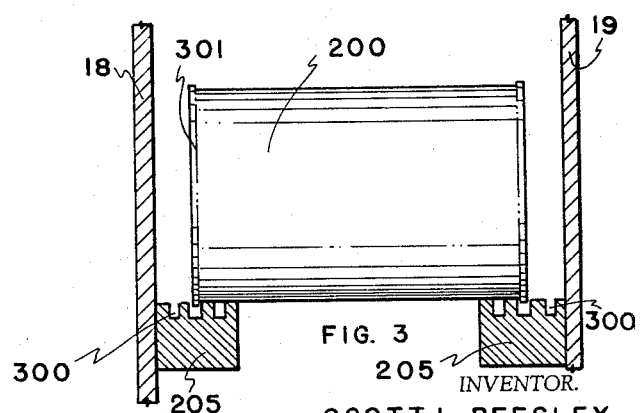
INVENTOR.
SCOTT L. BEESLEY
BY M. Ralph Shaffer
HIS ATTORNEY United States Patent Office 2,901,118
Patented Aug. 25, 1959

2,901,118

STORING AND DISPENSING APPARATUS

Scott L. Beesley, Salt Lake City, Utah

Application June 11, 1958, Serial No. 741,393

6 Claims. (Cl. 211—49)

This invention relates to apparatus for storing and dispensing filled containers such as cans of food, and more particularly to new and improved storage apparatus which operates by gravity feed, is versatile, and is adjustable for different sizes of containers.

Gravity feed storage and dispensing apparatus is not new. See for example the bottle dispensing refrigerator disclosed in the United States patent, No. 2,496,304, issued to G. Muffly in 1950. The gravity feed apparatus in that and in the present invention comprises a set of vertically superimposed, inclined travel chutes arranged in serpentine configuration. The great advantage of the gravity feed, chute multiplicity technique over the single, inclined plane type of gravity feed as disclosed in Fig. 2 of the United States patent, No. 2,443,871, issued to L. P. Shield in 1948, is storage capacity, and in most cases storage capacity is of prime importance.

For both home and commercial use it is highly desirable that the several storage "cells" in food storage apparatus be adjustable in size so that various sizes of cans of foodstuffs may be accommodated. Adjustability has been achieved in the single ramp (or chute) per cell type of apparatus, such as that disclosed in the United States patents, Nos. 2,443,871, 2,623,641 and 2,649,207, all issued to L. P. Shield.

However, storage cell adjustability in the case of multichute apparatus is a much more imposing engineering design problem, and to the inventor's knowledge has not as yet been solved. This is what the inventor has proposed to do.

Accordingly, an object of the present invention is to provide storage and dispensing apparatus for containers of generally cylindrical form, which apparatus will provide a battery of storage cells completely adjustable in dimension so that each cell may entertain the storage of a particular size of container, and each individual cell having a multiplicity of inclined chute elements so as to take advantage of the large capacity characteristic of serpentine storage.

An additional object of the present invention is to provide removable means for deterring the gravity flow of the stored containers in apparatus of the type described so that space will be reserved at the dispensing area of the apparatus for replacement of the particular container in use, where the containers stored are of a heavy character.

According to the present invention, the storage and dispensing apparatus is open at the front but may be provided with side, rear, top and bottom panels. The interior of the apparatus is divided into storage cells by a series of partitions. The distance between partitions is made adjustable so that each cell may be dimensional width-wise to accommodate any size (height) of cam or container to be stored therein. The top and bottom panels are each provided with a series of parallel grooves which travel from front to rear of the apparatus; or, as an alternative, grooved rails may be disposed in, or take the place of the top and bottom panels. Accordingly, the ends of the partitions are fitted into the appropriate grooves (top and bottom) in accordance with the size of the can to be accommodated.

Vertically spaced, superimposed, inclined chute rails are affixed to opposite sides of the several partitions (the inner side only in the case of end partitions) as by means of screws, glue or both. Accordingly, adjacent sets of chute rails associated with adjacent partitions cooperate to support the ends of the stored cans or containers.

An optional improvement on the basic apparatus is to provide the several chute rails with a plurality of longitudinal grooves on the upper surface thereof. These grooves serve as guides for the radial rim protuberances of conventional tin cans and so prevent binding and interruption of the gravity feed. The spacing between grooves preferably is much smaller than the spacing between the partition mounting panel grooves so that the rail grooves can function as a vernier or fine adjustment for can size, supplementing the coarse partition adjustment provided for by the top and bottom panel grooves so as to accommodate the storage of containers of a particular size.

An additional improvement feature is the provision of a stop (stop element or widened lateral groove) at each of the bottom chute rails of selected storage cells so that space will be provided to accommodate the replacement therein of presently used containers. This feature is particularly helpful where the containers are of heavy character.

The features of the present invention which are believed to be novel are set forth with particularity in the appended claims. The present invention, both as to its organization and manner of operation, together with objects and advantages thereof, may best be understood by reference to the following description, taken in connection with the accompanying drawings in which:

Figure 1 is a front elevation of the storing and dispensing apparatus of the present invention, with the apparatus shown broken away for the purpose of conservation of drawing space. While only two storage "cells" are shown in Figure 1, it will be understood that the apparatus may employ any number of such cells.

Figure 2 is a view partly in cross-section taken along the line 2—2 in Figure 1, indicating with particularity the storage and gravity flow of containers stored in the apparatus.

Figure 3 is a view partly in cross-section taken along the line 3—3 in Figure 2.

Figure 4 is a view partly in cross-section taken along the line 4—4 in Figure 1.

In Figure 1 the storing and dispensing apparatus 10 includes side panels 11 and 12, top and bottom panels 13 and 14 and rear panel 15. The several panels may be glued together or otherwise affixed as by screws, for example. Top and bottom panels 13 and 14 are shown to have a series of parallel grooves 16 which accommodate the selective positioning therewithin of the ends of partitions 17 and 18 (and such other partitions as may be used). Partition 19 may be fixed in its position, if desired, since it serves as an end partition or wall.

Accordingly, and by reason of the several grooves 16 in the top and bottom panels 13 and 14, the spacing between the several partitions may be discreetly adjusted so that the several storage cells formed by adjacent partitions will assume appropriate size for their accommodation of stored food containers or the like.

For an understanding of the method and means of storing and dispensing of containers within apparatus 10, reference is made to Figure 2.

In Figure 2 it is illustrated that the partition 18, for example, is provided on both surfaces thereof with a respective set of inclined, vertically interspaced chute rails arranged in a serpentine manner. It will of course be understood that in the case of partition 19 (an end partition) the chute rails will be disposed only on the inner side of the partition. Accordingly, the several containers 200 progress downwardly in the respective storage cells until they reach a disposition 201, which disposition is determined by a triangularly-shaped stop 202, the stop being appropriately keyed into the bottom chute rail as shown. (It will be understood that a widened lateral groove—the stop groove 203 of the drawing—may be used as a stopping means in lieu of the stop element to accomplish the same purpose.)

It should be mentioned at this juncture that the stop (or groove) is necessary only in those situations in which the containers are relatively heavy in toto and it is desired that the last container 204 be replaceable in the apparatus during intermittent use.

Corresponding chute rails are respectively disposed on both sides of each of the inner partitions. Thus, adjacent chute rails of corresponding disposition, of adjacent partitions, support the ends of the containers which roll along the same to progress downwardly in the storage cell.

Figure 3 illustrates that each of the chute rails 205 in Figure 2 may be provided on its upper surface with a series of parallel longitudinal grooves 300. The series of groove 300 associated with each of the chute rails should preferably occupy a minimum space so that the grooves may serve as a vernier or fine adjustment, in cooperation with the coarse adjustment provided by the grooves 16 in Figure 1, so as to accommodate cans or containers of a variety of sizes. The grooves 300 in Figure 3 themselves serve as guides for the serpentine column of cans in that the radial, rim protuberances 301 of the cans 200 will travel therealong, thus precluding any binding or interruption in the gravity flow of the cans.

As indicated above, corresponding chute rails 205 may be affixed to the adjacent partitions 18 and 19 by means of glue, screws or other means.

Figure 4 illustrates that, as an alternative to the supplying of grooved top and bottom panels as indicated in Figure 1, a pair of similarly-grooved mounting rails 400 may be mounted on the inner side of such top and bottom (14') panels, or may in fact take the place of such panels. Accordingly, the partition 17 may be appropriately positioned at top and bottom in the appropriate pair of grooves 401 associated with mounting rails 400.

Referring again to Figure 1 it will be seen that in those instances where bottles and jars are to be stored in the apparatus, the chute rails on the neck-side of the stored bottles or jars are elongated width-wise so that the rails will come in contact with the main cylindrical bodies thereof proper.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. Apparatus for storing and dispensing containers of generally cylindrical configuration, said apparatus including, in combination: a plurality of parallel, vertical partitions; a multiplicity of sets of chute rails, the rails in each of said sets being inclined and vertically interspaced to accommodate the storage and gravity feed of said containers, the lower chute rail of each set having means for impeding such gravity feed, each set being mounted on a side of one of said partitions, both sides of said partitions except the outer side of each of the end partitions being provided with a respective set of said chute rails, and adjacent sets of rails associated with adjacent partitions being of corresponding disposition to cooperate in producing such storage and gravity feed of those containers confined in the storage cells defined by such adjacent partitions; and means for selectably interspacing said partitions a selectable distance apart.

2. Apparatus according to claim 1 in which said interspacing means comprises upper and lower panels provided with a plurality of parallel grooves into which the ends of said partitions may be selectively received.

3. Apparatus according to claim 1 in which said interspacing means comprises a pair of upper mounting rails and a pair of lower mounting rails, each pair being provided with a plurality of parallel grooves into which the ends of said partitions may be selectively received.

4. Apparatus according to claim 1 in which each of the chute rails enclosed in those storage cells intended for storing cans having rim protuberances is provided with a series of parallel guide grooves on its upper surface adapted to accommodate such protuberances.

5. Apparatus according to claim 1 in which, for those storage cells intended to store objects such as bottles and jars having necks of constricted size relative to the main cylindrical bodies thereof, the set of chute rails to be associated with said bottle and jar necks are elongated width-wise so that physical contact thereby with the objects takes place beyond said necks, with the cylindrical bodies proper.

6. Apparatus according to claim 1 in which both of the lower chute rails in at least one of said storage cells are provided with stop means for interrupting said gravity feed to provide space at the apparatus' dispensing area into which a container intermittently in use can be repositioned for convenient storage.

References Cited in the file of this patent

UNITED STATES PATENTS

| | | |
|---|---|---|
| 570,338 | Reed | Oct. 27, 1896 |
| 584,167 | Shanklin | June 8, 1897 |
| 2,382,191 | Weichselbaum | Aug. 14, 1945 |